L. J. RIDDLE.
GRASS CATCHER.
APPLICATION FILED MAY 16, 1914.

1,134,489.

Patented Apr. 6, 1915.

WITNESSES:

INVENTOR
Lawrence J. Riddle
BY
L. L. Westfall
ATTORNEY

UNITED STATES PATENT OFFICE.

LAWRENCE J. RIDDLE, OF CHENEY, WASHINGTON, ASSIGNOR OF ONE-HALF TO JOHN E. TORMEY, OF CHENEY, WASHINGTON.

GRASS-CATCHER.

1,134,489.

Specification of Letters Patent.

Patented Apr. 6, 1915.

Application filed May 16, 1914. Serial No. 839,174.

*To all whom it may concern:*

Be it known that I, LAWRENCE J. RIDDLE, a citizen of the United States of America, residing at Cheney, in the county of Spokane and State of Washington, have invented certain new and useful Improvements in Grass-Catchers, of which the following is a specification.

This invention pertains to lawn mowers and has for its object to provide a grass catcher to be attached to a lawn mower for the reception of the mowings constructed along new and improved lines.

One of the principal objects is to provide a construction whereby such grass catcher may be readily opened or separated at the bottom for the purpose of emptying the catcher of the mowings contained therein.

Other and further objects and purposes will be hereinafter explained and disclosed in the accompanying drawings, in which—

Figure 1:
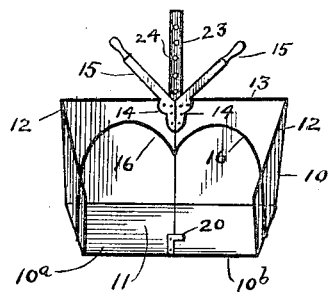
Figure 2:
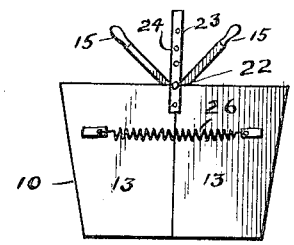
Figure 3:
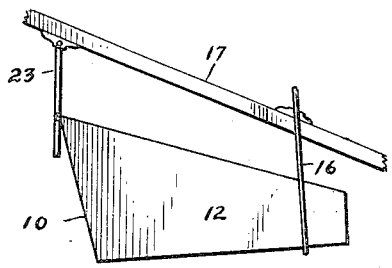
Figure 4:
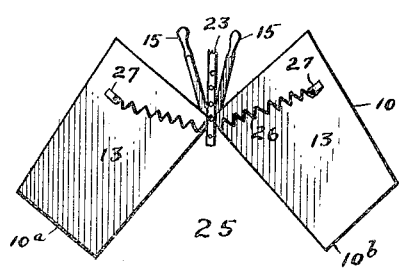
Figure 5:
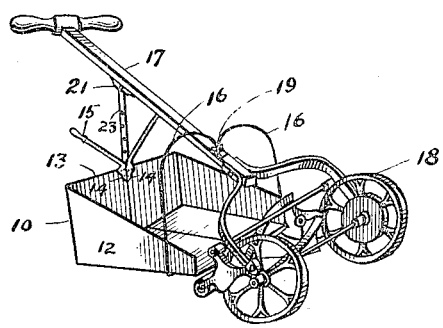

Figure 1, is a front view of the catcher detached from a mowing machine, Fig. 2, is a rear view of the same, Fig. 3, is a side view of the same, together with a broken-away view of a lawn mower handle to which the same is attached, Fig. 4, is a rear view of the grass catcher detached and in an opened position, and Fig. 5, is a perspective view of a lawn mower with the grass catcher attached.

In a detailed description of the device, the grass catcher 10 comprises a bottom 11, side walls 12, a rear wall 13, and has an open top and front. The catcher 10 is divided longitudinally through the center thereof, dividing the same into the parts $10^a$ and $10^b$. The side, rear and bottom walls of each of the parts $10^a$ and $10^b$ are connected to each other. Attached to the rear walls 13 of the catcher 10, one on each the parts $10^a$ and $10^b$, as at 14, are handles 15. Attached to each of the parts $10^a$ and $10^b$ are rods 16, which are preferably arched as shown in Figs. 1 and 5 and furnish a means for securing the catcher 10 to the handle 17 of the lawn mower 18, each of said rods 16 being pivoted to the handle 17 as at 19. A catch 20 at the front end of the bottom 11 serves to hold the parts $10^a$ and $10^b$ together in proper relation to each other.

Pivoted to the lawn mower handle 17, as at 21, (Fig. 5) and to the catcher 10 as at 22 is a rod 23 provided with holes 24, the pivot 22 being adjustable to any of the holes 24 as a means for regulating the height of the rear end 13 of the pan 10.

In the practical application of the device, the catcher 10 is attached to a mowing machine as shown in Fig. 5. When the catcher 10 becomes filled with the mowings and it is desired to empty the same, it is only necessary to manually throw the handles together as shown in Fig. 4, which separates the parts $10^a$ and $10^b$ as shown in said figure and allow the mowings to escape through the opening 25. The handles 15 are then released and a coil spring 26 attached to each of the parts $10^a$ and $10^b$ on the rear wall 13 as at 27, brings the parts together again to the position shown in Fig. 1 and the catcher 10 is again ready for catching the mowings.

What is claimed is,

1. A grass catcher comprising a receptacle adapted for being attached to a lawn mower at the rear thereof and adjacent thereto, said receptacle having a bottom, side and rear walls, with open top and front, the bottom and rear walls being longitudinally split at the center thereof and formed into two portions, with the side, rear and bottom walls of each portion connected together and pivoted together near the top of the rear wall and the bottom portions held in alinement by a catch attached thereto, the side walls being attached to the handle of the lawn mower by arched rods attached to the side walls pivoted to the handle and the rear wall attached to the handle by a rod secured to the rear wall and pivoted to the handle, handles attached to the rear walls as a means for manually separating the two portions of the catcher and turning them upwardly in the path of the arched rods and a spring attached to the rear wall of the catcher adapted for returning the two parts of the catcher together to normal position.

2. A grass catcher comprising a receptacle adapted for being attached to a lawn mower at the rear thereof and adjacent thereto, said receptacle having a bottom, side and rear walls, with open top and front, the bottom and rear walls being longitudinally split at the center thereof and formed into two portions, with the side, rear and bottom walls of each portion connected together and pivoted together near the top of the rear wall and the bottom portions held in alinement by a catch attached thereto, the side walls being attached to the handle of the lawn mower by arched rods attached to the side walls pivoted to the handle and the rear wall attached to the handle by a rod secured to the rear wall and pivoted to the handle, handles attached to the rear wall as a means for manually separating the two portions of the catcher and turning them upwardly in the path of the arched rods and a spring attached to the rear wall of the catcher adapted for returning the two parts of the catcher together to normal position, said rod connecting the rear wall with the mower handle being adapted for adjustment to regulate the height of the rear end of the catcher.

In testimony whereof I affix my signature in presence of two witnesses.

LAWRENCE J. RIDDLE.

Witnesses:
L. L. WESTFALL,
H. M. WILEY.

Copies of this patent may be obtained for five cents each, by addressing the "Commissioner of Patents, Washington, D. C."